(Model.)

G. W. BLAKE.
HARNESS.

No. 247,296. Patented Sept. 20, 1881.

WITNESSES:
Francis McArdle.
C. Sedgwick

INVENTOR:
G. W. Blake
BY Munn & Co.
ATTORNEYS.

UNITED STATES PATENT OFFICE.

GEORGE W. BLAKE, OF PORT TOWNSEND, WASHINGTON TERRITORY.

HARNESS.

SPECIFICATION forming part of Letters Patent No. 247,296, dated September 20, 1881.

Application filed April 21, 1881. (Model.)

*To all whom it may concern:*

Be it known that I, GEORGE W. BLAKE, of Port Townsend, in the county of Jefferson, Washington Territory, have invented a new and useful Improvement in Harness for Horses, of which the following is a specification.

My improved harness is for use in working or in breaking a horse, and also in driving vicious horses, the object being to permit freedom to the animal in walking or trotting and prevent kicking and running.

My invention consists in a gearing which limits the movement of the animal's limbs, a safety device combined therewith and connected with the reins, and an improved breeching for working purposes, the construction and application of which I will describe hereinafter with reference to the accompanying drawings, forming part of this specification.

Figure 1:
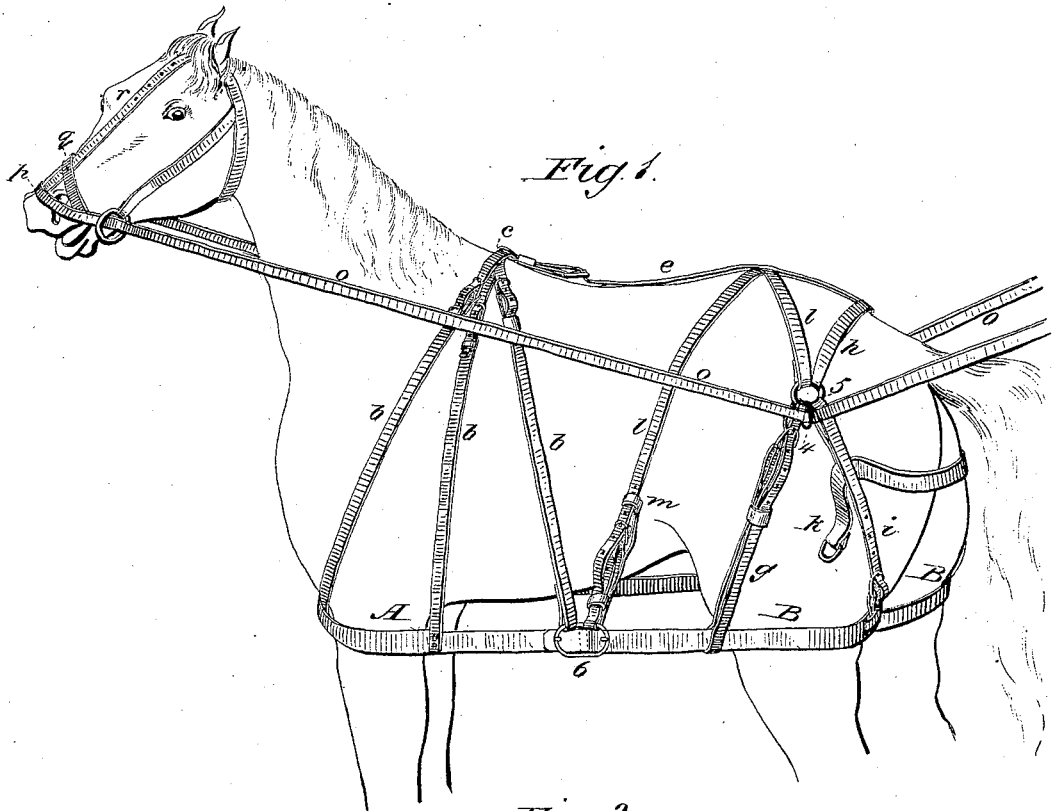
Figure 2:
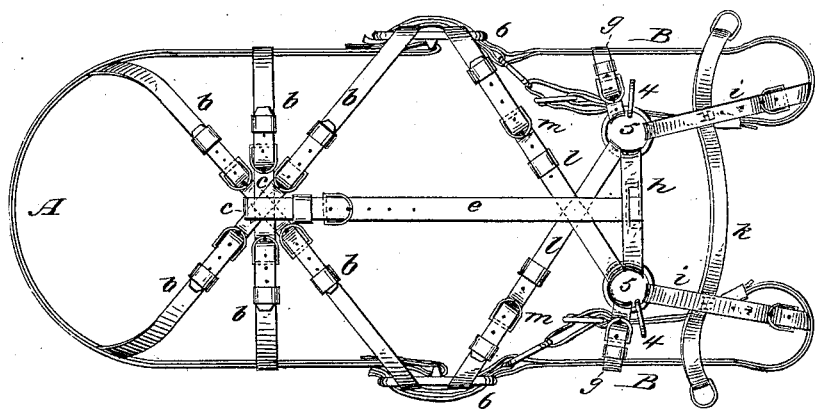

In the drawings, Figure 1 is a side view of my harness as applied to a horse. Fig. 2 is a plan view of the harness.

Similar letters of reference indicate corresponding parts.

A is the breast-strap. B B are ham-straps, buckled to the ends of breast-strap A by buckles 6, and also buckled around the hind legs of the animal.

$c\ c\ c$ are straps crossing each other over the withers and sustaining the breast-strap A by the straps $b$, which are buckled to $c$ and connect with A.

$h$ is a strap passing over the rump, and fitted at the ends with rings 5, and sustaining the ham-strap B by means of the double straps $g$ and the straps $i$, which pass from the rings 5 to strap B.

4 4 are rings connected to rings 5, for the reins to pass through.

$l\ l$ are straps connected to rings 5, crossing on the horse's back, and connected by buckles $m$ to the buckles 6.

$e$ is a back-strap, connecting the straps $c$ and $h$, to retain them in place.

The strap $k$ is intended for use as a breeching-strap. It passes around the butt, and is connected to straps $i$ about half-way between the rings 5 and ham-straps B. The ends of this strap $k$ are to be passed through the double straps $g$ on each side, and then buckled to the breast-strap A.

To use this safety-gear and breeching with a Concord harness, the straps B are to be disconnected from A at the buckle 6, and straps $l$ disconnected by loosening buckles $m$. The back-strap $e$ is also to be disconnected from $c$ and connected to the usual strap connecting the top of the hames, and straps B and $l$ connected to the usual tug-buckle of the Concord harness.

O is the safety check-rein, the nose-piece of which is formed of a leather strap, $p$, and elastic strap $q$. The ends of rein O are to be passed through the bridle-rings at the bit, as shown, and drawn back through the rings 4 on the strap $h$. The strap $r$ of the nose-piece is to be connected to the crown-strap of the bridle.

This harness is intended for breaking and controlling horses, and may be used as a whole for that purpose or in part with ordinary harness. It has the effect to bind the animal in a harmless manner, and cannot be shaken off. The harness may be slackened so that the animal may move naturally in walking or trotting, and at the same time will prevent the animal from running or kicking. When the safety-reins are pulled the leather nose-strap acts to partially smother the horse and render him more easily controlled than by a bit alone. When the reins O are slackened the rubber strap $q$ will contract and draw the strap $p$ off the nose, to allow free respiration. This safety-rein is effective and harmless, and permits control of the animal without lacerating the mouth, as usual with a bit. It is especially useful for controlling a young horse without injury to the mouth, and for managing a vicious horse.

Having thus fully described my invention, I claim as new and desire to secure by Letters Patent—

1. The harness for breaking and controlling horses, consisting of the breast-strap A, provided with buckles and ham-straps B, fitted for passing around the hind legs, with the sustaining-straps $b$, $l$, $g$, $h$, and $i$, combined and connected substantially as shown and described.

2. In combination with the controlling-harness consisting of breast-strap A, ham-straps B, and their supporting-straps, the breeching-strap k, connected in the manner substantially as shown and described.

3. In combination with the controlling-harness having the rein-rings 4, the safety-reins O, provided with the nose-strap p and elastic strap q, substantially as and for the purposes set forth.

GEORGE WASHINGTON BLAKE.

Witnesses:
FRANCIS W. JAMES,
SAMUEL HADLOCK.